US012619994B1

(12) United States Patent
Khmelev et al.

(10) Patent No.: US 12,619,994 B1
(45) Date of Patent: May 5, 2026

(54) SYSTEM AND METHODS FOR DYNAMIC BLOCKCHAIN FINANCIAL TRANSACTIONS

(71) Applicant: UIPCO, LLC, San Antonio, TX (US)

(72) Inventors: Yevgeniy Viatcheslavovich Khmelev, San Antonio, TX (US); Gregory Brian Meyer, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 440 days.

(21) Appl. No.: 17/649,073

(22) Filed: Jan. 27, 2022

Related U.S. Application Data

(60) Provisional application No. 63/142,027, filed on Jan. 27, 2021.

(51) Int. Cl.
| | |
|---|---|
| *G06Q 20/42* | (2012.01) |
| *G06Q 20/20* | (2012.01) |
| *G06Q 20/38* | (2012.01) |
| *G06Q 20/40* | (2012.01) |

(52) U.S. Cl.
CPC ......... *G06Q 20/425* (2013.01); *G06Q 20/202* (2013.01); *G06Q 20/38215* (2013.01); *G06Q 20/3825* (2013.01); *G06Q 20/4014* (2013.01)

(58) Field of Classification Search
CPC .............. G06Q 20/425; G06Q 20/202; G06Q 20/38215; G06Q 20/3825; G06Q 20/4014
See application file for complete search history.

(56) References Cited

U.S. PATENT DOCUMENTS

| | | | | |
|---|---|---|---|---|
| 10,282,558 B2* | 5/2019 | Chan | | G06F 21/64 |
| 2005/0137975 A1* | 6/2005 | Williams | | G06Q 40/08 |
| | | | | 705/40 |
| 2015/0006386 A1* | 1/2015 | Tebbe | | G06Q 20/3274 |
| | | | | 705/44 |
| 2017/0046679 A1* | 2/2017 | Gotlieb | | G06Q 20/34 |
| 2018/0247312 A1* | 8/2018 | Loganathan | | G06Q 20/4014 |
| 2019/0392450 A1* | 12/2019 | Gosset | | H04L 63/083 |
| 2024/0333500 A1* | 10/2024 | Desmarais | | G06F 21/74 |

* cited by examiner

*Primary Examiner* — Davida Lee King
(74) *Attorney, Agent, or Firm* — Plumsea Law Group, LLC

(57) ABSTRACT

A system and method for generating virtual financial accounts that may be used to consummate transactions when the mobile device is off-line. The virtual financial accounts are generated in mobile devices that are associated with financial institutions. The financial accounts may be credit card or debit card accounts. Each attempted financial transaction by the mobile device is treated as a unique event. An app running on the mobile device calculates a risk score for the attempted transaction based on factors such as GPS location and typical spending patterns for the financial account, and then approves or denies the transaction. In some cases, biometric verification devices (such as fingerprints, facial recognition or voice recognition) may be used by the app to further authenticate the transaction.

13 Claims, 11 Drawing Sheets

300

500

600

TRANSACTION
REQUESTED ⌐602

604⌐ DEVICE
APPROVAL
?

NO → DISPLAY
"DENIED" ⌐606

YES

614⌐ PASS VIRTUAL CARD #
TO MERCHANT

ONLINE: UPDATE
ML MODULE ⌐608

616⌐ MERCHANT PASSES
VIRTUAL CARD # AND
AMOUNT TO
INSTITUTION

SEND NEW
CODES ⌐610

618⌐ CONTINUED ON
STEP 702,

UPDATE
BLOCKS ⌐612

700

702 — CONTINUED FROM STEP 618, FIG. 6

704 — SERVER CHECKS VIRTUAL CARD # AND AMOUNT

706 — APPROVED ?

NO

712 — NOTIFICATIONS

714 — UPDATE ML MODULE

716 — SEND NEW CODES

718 — UPDATE BLOCKS

YES

708 — NOTIFY MERCHANT

710 — CONTINUED ON STEP 802, FIG. 8

900

902

RISK SCORE CACULATOR

906 — • INDIVIDUAL TRANSACTION PATTERNS

908 — • TRANSACTION PATTERNS OF GENERAL MEMBERSHIP

910 — • TRANSACTION LOCATION HISTORY

912 — • MERCHANT FRAUD RISK SCORES BASED ON GEOGRAPHIC REGION

914 — • TRANSACTION SIZE

904

SYSTEM AND METHODS FOR DYNAMIC BLOCKCHAIN FINANCIAL TRANSACTIONS

This application claims the benefit of Provisional Patent Application No. 63/142,027, filed Jan. 27, 2021, and titled "Systems and Methods for Dynamic Blockchain Financial Transactions," which is incorporated by reference herein in its entirety.

TECHNICAL FIELD

This disclosure relates to systems, methods, and mobile devices which implement secure off-line blockchain financial transactions for a mobile device.

BACKGROUND

Implementing credit card functions using mobile devices (such as smartphones) is well known in the art. Such services allow users to wed an authenticated mobile device to a financial account, such as a credit card account or a bank account. Purchases at cooperative vendors can then be executed by communication between the mobile device and the vendor's point of sale system, without the user needing to present a physical card associated with the financial account. Such a system is limited by the need for a wireless communication (such as a WiFi or cellular network connection to the internet) between the mobile device and servers associated with the financial institution that approve or deny the purchase, for example. The financial institution may approve or deny the transaction, based on security or account considerations, such as the current balance. Additionally, time is required for this wireless communication between remote servers and the mobile devices.

For these reasons, there is a need for systems, methods, and mobile devices that implement secure off-line financial transactions.

SUMMARY

In one aspect, embodiments include a mobile device that allows a person holding the mobile device to consummate financial transactions when the mobile device is off-line. The mobile device includes a preloaded set of financial blocks which are associated with a financial institution. The mobile device is assigned transaction authorization codes which are associated with the financial blocks. The transaction authorization codes act as a virtual credit card number or a virtual debit card number. Each financial block includes a dynamically assigned monetary limit. An app on the mobile device is configured to calculate a risk score for any attempted transaction, and to approve or deny an attempted transaction based upon the risk score and the monetary limit included in the financial block. A screen on the mobile device displays information relating to the attempted transaction.

In another aspect, embodiments include a mobile device that has a managing app and a set of financial blocks. Each financial block is associated with an authorization code. The mobile device also has a wireless communications module that is configured to communicate with point-of-sale terminals. The managing app is configured to determine whether a proposed transaction should be authorized based upon data associated with at least one financial block. The managing app is also configured to submit a virtual credit block credential and an authorization code to a specific point-of sale terminal whenever the proposed transaction is consistent with the data stored associated with the financial block.

On yet another aspect, embodiments include a system for consummating proposed transactions when remote mobile devices associated with an institution are off-line. The system includes a server housed at the institution in communication with a database that stores transaction authorization codes. The institution also includes a database of accounts associated with the remote mobile devices. The accounts may be bank accounts or credit card accounts. The server is configured to transmit dynamic financial blocks identified by transaction authorization codes to the remote mobile devices for use as virtual credit blocks when the remote mobile devices are off-line. When the remote mobile devices are back on-line, the server is configured to settle any transactions consummated by the remote mobile devices when the remote mobile devices were off-line, and to debit the accounts accordingly.

On yet another aspect, embodiments include a system for consummating proposed transactions when point of sale machines do not have connectivity themselves due to natural events or internet interruption for any reason. In this embodiment, the provider of the point of sale system would daily provide an update of credit card provider transaction blocks of virtual credit card numbers from contributing banks. These blocks would authenticate by applying POS specific risk rules that could limit the amount of purchase and type of purchase and match the consumer mobile device app provided blocks to allow local consummation of proposed transactions without the need of present connectivity to financial institutions. For example, a corner store could be provided blocks for cards regularly seen at the specific store in the last month. Those persons, according to the risk controls, are allowed to purchase the range and amount of products they have previously purchased in a given 30 days. For items outside of that range, such as alcohol or cigarettes, risk controls may limit the amount of purchase. For cards that have not been seen in that store in the past 30 days, risk controls would provide a monetary limit of the amount of purchase appropriate for the POS as compared to a big box grocery store which would have potentially higher limits and a wider array of items included in the risk control assessments.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings like reference numerals designate corresponding parts throughout the drawings.

DESCRIPTION OF EMBODIMENTS

Figure 1:
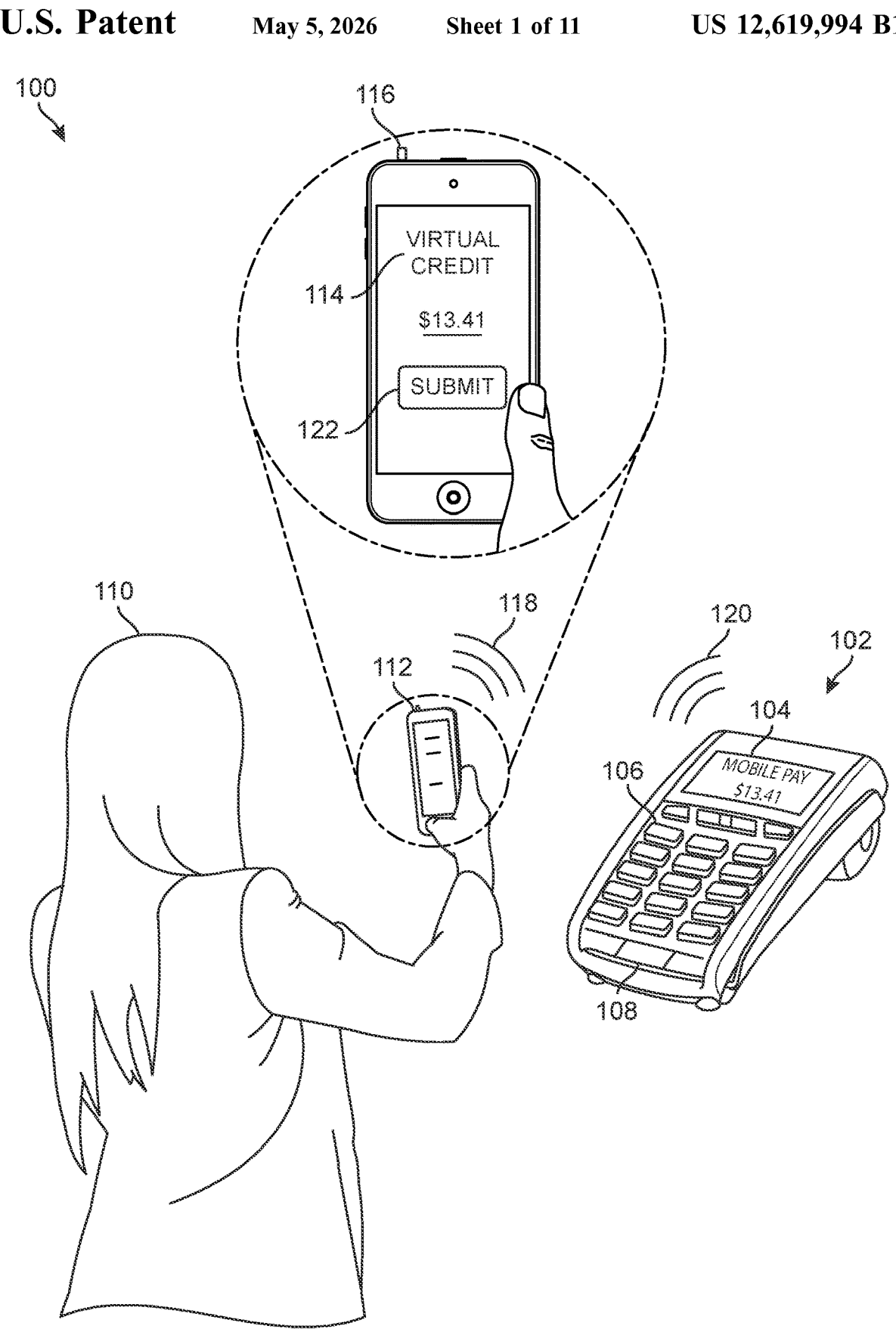
FIG. 1 is a schematic diagram of an example of a customer using a mobile device to wirelessly undertake a financial transaction.

Embodiments described below relate to virtual financial accounts associated with mobile devices that, in turn are associated with their respective financial institutions (such as a bank, credit union, savings and loan, credit card issuer, insurance companies or other financial institutions). In one embodiment, the financial account is a "credit card"-type account. Each attempted financial transaction by the mobile device is treated as a unique event. An app running on the mobile device calculates a risk score for the attempted transaction based on factors such as GPS location and typical spending patterns for the financial account. In some cases, biometric verification devices (such as fingerprints, facial recognition or voice recognition) may be used by the app to further authenticate the transaction.

If the attempted financial transaction occurs while the mobile device is off-line, the app makes use of a pre-loaded set of "financial blocks." Each financial block is associated with a dynamically assigned "transaction authorization code" which acts as a virtual credit card number, and is encrypted then sent to the mobile device before it went off-line. The financial blocks may also include monetary limits. In some cases, the set of financial blocks may be constituted as a blockchain ledger. Additionally, the financial block transactions are digitally signed by the mobile device, so it is apparent to all parties (including the merchant and the financial institution) which mobile device requested the transactions. Under low risk conditions, this set of financial blocks could be five $100 increments, for example. The financial blocks are dynamic virtual credit blocks. For example, if a risky transaction has occurred, the number of financial blocks and monetary limits of the remaining financial blocks might be reduced dynamically. In some embodiments, these transaction authorization codes may be for "one-time" use. In those cases, each successive attempted transaction would have its own transaction authorization code.

In the event the merchant does not have a "mobile pay"-type platform, the merchant can literally use the virtual credit card number or debit card number, for example, as if it was the number of a plastic credit card. In this embodiment, the financial institution's financial server must still authorize the transaction when it is passed the virtual card number by the merchant. In those cases, when the mobile device goes back online, the financial server checks to make sure the ledger stored on the mobile device agrees with its record of transactions it has received for the account, and clears the "blockchain ledger," for example, stored on the mobile device. It also pushes a new set of transaction authorization codes, feeds the recorded transaction data updates to the machine learning algorithm, and updates the size of the dynamic financial blocks, if necessary.

The off-line capabilities of these embodiments make them particularly useful in the event of a catastrophe which knocks out cellular networks. In such circumstances, if merchants' point of sale systems are still functioning, customers can make use of their pre-loaded financial blocks to make purchases while their mobile devices are off-line. This could be critically important in some cases, depending upon the nature of the catastrophe.

As used herein, the terms "customer" and "user" are used interchangeably, and shall refer to a person who has a relationship with a financial institution. The terms "financial institution" and "institution" are used interchangeably and shall refer to a bank, a savings and loan, a credit union, a credit card issuer, a debit card issuer, an insurance company and/or other financial institutions.

FIG. 1 is a schematic illustration 100 of a customer 110 using a mobile device 112 to wirelessly undertake a financial transaction using dynamic virtual credit blocks loaded onto mobile device 112, in one embodiment. In this embodiment, the dynamic virtual credit blocks loaded onto mobile device 112 may work with existing mobile pay platforms. In this embodiment, the virtual credit blocks may be linked to and derived from a credit card account or a bank account, for example, associated with a financial institution. In this embodiment, a merchant point-of-sale terminal 102 implements a mobile-pay platform 104 which uses a local wireless connection to mobile device 112. This connection is indicated by radio wave 118 broadcast by mobile device 112 and the incoming radio wave 120 broadcast by point-of-sale terminal 102. In some embodiments, such a connection uses a wireless data transfer technology such as near field communications (NFC) technology or Bluetooth, for example. Point-of-sale terminal 102 also includes a chip card reader 108 for debiting financial accounts by reading a microcontroller chip embedded in a physical financial account card (such as a credit or debit card), and a keypad 106 that customers can use to enter their PIN numbers, if the customers elect not to use a mobile-pay platform.

In this embodiment, point-of-sale terminal 102 includes a display controlled by mobile pay platform 104 that tells the customers how much is to be debited from their accounts. As shown in the blow-up of mobile device 112, mobile device 112 includes a touch screen 114 for displaying payment information and receiving instructions from customer 110 regarding the imminent transaction. Mobile device 112 includes antenna 116 for transmitting outgoing radio wave 118 and receiving incoming radio wave 120. For example, customer 110 may initiate payments by pressing "submit" button 122 on touch screen 114.

Figure 2:
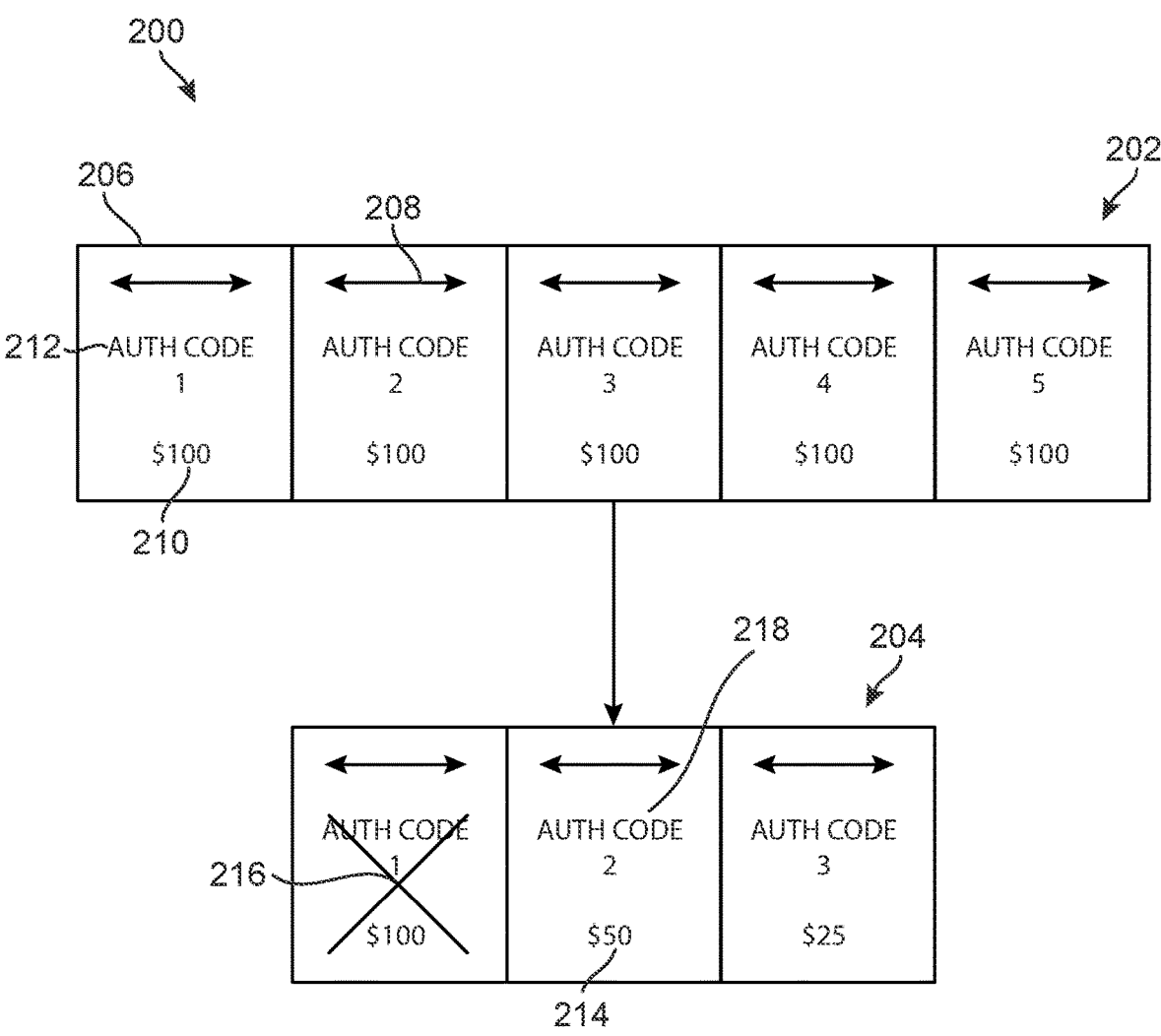
FIG. 2 is a schematic diagram representing the characteristics of virtual credit blocks, in an embodiment.

FIG. 2 is a schematic diagram 200 representing exemplary characteristics of virtual credit blocks 206, in an embodiment. In this exemplary embodiment, a blockchain ledger 202 of virtual credit blocks 206 has been loaded onto a mobile device while the mobile device is in remote communication with the financial institution that maintains a credit card account to which the virtual credit blocks are linked and from which they are derived. In this embodiment, each virtual credit block is for one-time use. In the example shown in FIG. 2, there are five virtual credit blocks in blockchain ledger 202. Therefore, the customer can undertake up to five separate financial transactions on the account before having to connect remotely to the financial institution to settle those transactions and load further blocks in this exemplary embodiment. In other embodiments, rather than being for one-time use, each virtual credit block is limited for use over a pre-specified time interval. Thereafter, the next virtual credit block in sequence is activated for further financial transactions. Other embodiments may have different limits or may have no such limits.

Each virtual credit block is associated with an authorization code 212 and a monetary limit 210. In this embodiment, monetary limit 210 sets the maximum dollar value of each attempted financial transaction undertaken using these virtual credit blocks. In other embodiments, attempted financial transactions which exceed monetary limit 210 but do not exceed the sum of the monetary limits of each block in blockchain ledger 202 would potentially be allowed but would be then associated with the number of credit blocks needed to meet or exceed the transaction amount.

Authorization code 212 serves to identify each specific financial transaction carried out by the mobile device using these virtual financial blocks. In this embodiment, authorization code 212 and the monetary limit 210 are generated by the financial institution and transmitted to the mobile device using suitable encryption. In embodiments in which these virtual credit blocks are associated with credit card numbers, for example, authorization code 212 would be associated with a specific credit card number. In some embodiments, customer preferences are used to set monetary limits.

Each financial block may change, based on a risk score calculation for attempted financial transactions performed by an app on the mobile device that manages these attempted financial transactions, in this embodiment. This is indicated in schematic diagram 200 by range 208. In this diagram, the customer may use block 206 to initiate an attempted financial transaction. As is typical in blockchain transactions, each specific attempted transaction and its associated virtual credit block is digitally signed by the managing app so that all parties to the transaction (the merchant, the customer, and the financial institution) have some degree of confidence in the authenticity of the attempted financial transaction. Moreover, in some of the embodiments, all the attempted financial transactions and their associated virtual credit blocks are linked together mathematically through these digital signatures, thus forming a chain that would be extremely difficult to manipulate. In some embodiments, additional transactional security is ensured by distributing copies of this blockchain ledger throughout a network.

The evolution of block 206 is indicated in FIG. 2 by element 216. This evolution lowers the monetary limit of the next virtual credit block, as indicated by altered monetary limit 214, creating a new blockchain 204 of virtual credit blocks containing fewer virtual credit blocks and having new transaction authorization codes 218. Once the mobile device later connects remotely to the financial institution, settlement between the executed financial transactions and the credit account occurs using the chain formed by the executed virtual credit blocks.

In this embodiment, all the information contained in blockchain ledger 202 is transmitted with suitable encryption between the mobile device and the remote server.

Figure 3:
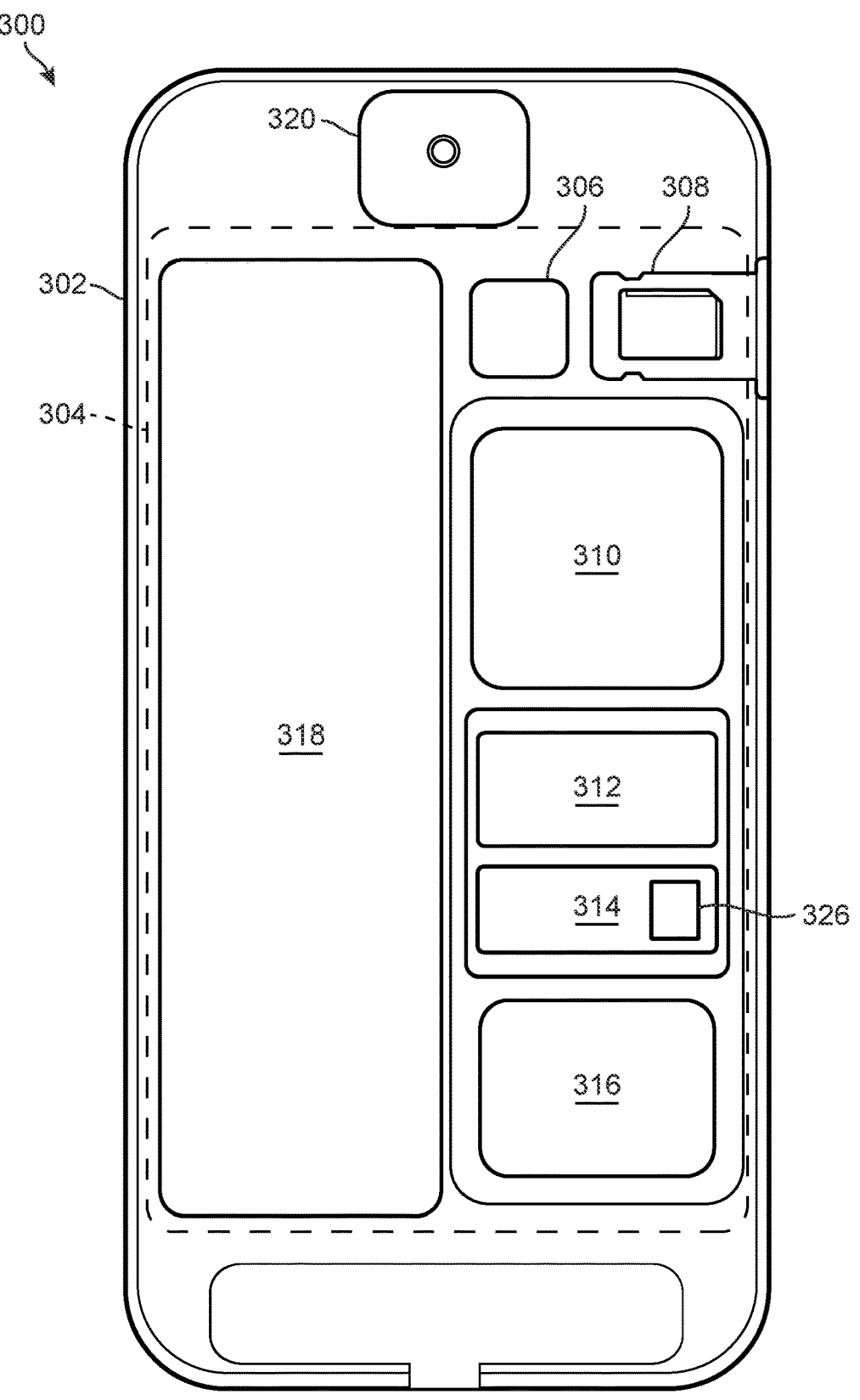
FIG. 3 is a schematic diagram of common components of a smart phone that may be used to implement the embodiments disclosed herein.

FIG. 3 is a schematic diagram 300 of common components of a smart phone 302 that may be used to implement the embodiments disclosed herein. Functionally similar components are present in the other types of computing mobile devices listed above. In this example, smart phone 302 includes a touch screen and display 304, which displays applications and data stored on smart phone 302. Smart phone 302 additionally includes a GPS component 306. Smart phone 302 includes a subscriber identity module (SIM) 308 with which smart phone 306 registers on cellular/ data networks. In some embodiments, SIM 308 also serves as an identifying means with which to associate smart phone 302 with a particular customer who has an account on a remote server.

Smart phone 302 includes a processing unit 310 which acts as a control module for the components of mobile device 302, including display 304 and camera 320. Smart phone 302 includes a connection module 312. Connection module 312 is associated with wired connections to smart phone 302, for example, for charging smart phone 302 or for making a wired connection between smart phone 302 and another device.

Smart phone 302 includes a memory 314. Memory 314 stores a variety of data and applications, including pre-loaded applications and data that would be typically loaded onto such a mobile device and applications and data that have been stored in the course of regular use of smart phone 302 by a particular customer and are thus characteristic of the particular customer using smart phone 302. For example, app 326, which executes the procedures disclosed herein, may be stored in memory 314 or in another memory within smart phone 302. Smart phone 302 includes communications module 316 which controls communications with the institution server and/or with a cloud server. Communications module 316 executes wireless communications (such as Wi-Fi, Bluetooth, near field communication (NFC) technologies, and communications over the Internet) between smart phone 302 and other devices, servers, and databases. Communications module 316 thus functions as a link between a remote server seeking to analyze characteristic apps and data stored on smart phone 302. Smart phone 302 includes a battery 318 which provides power to the various components of smart phone 302.

Figure 4:
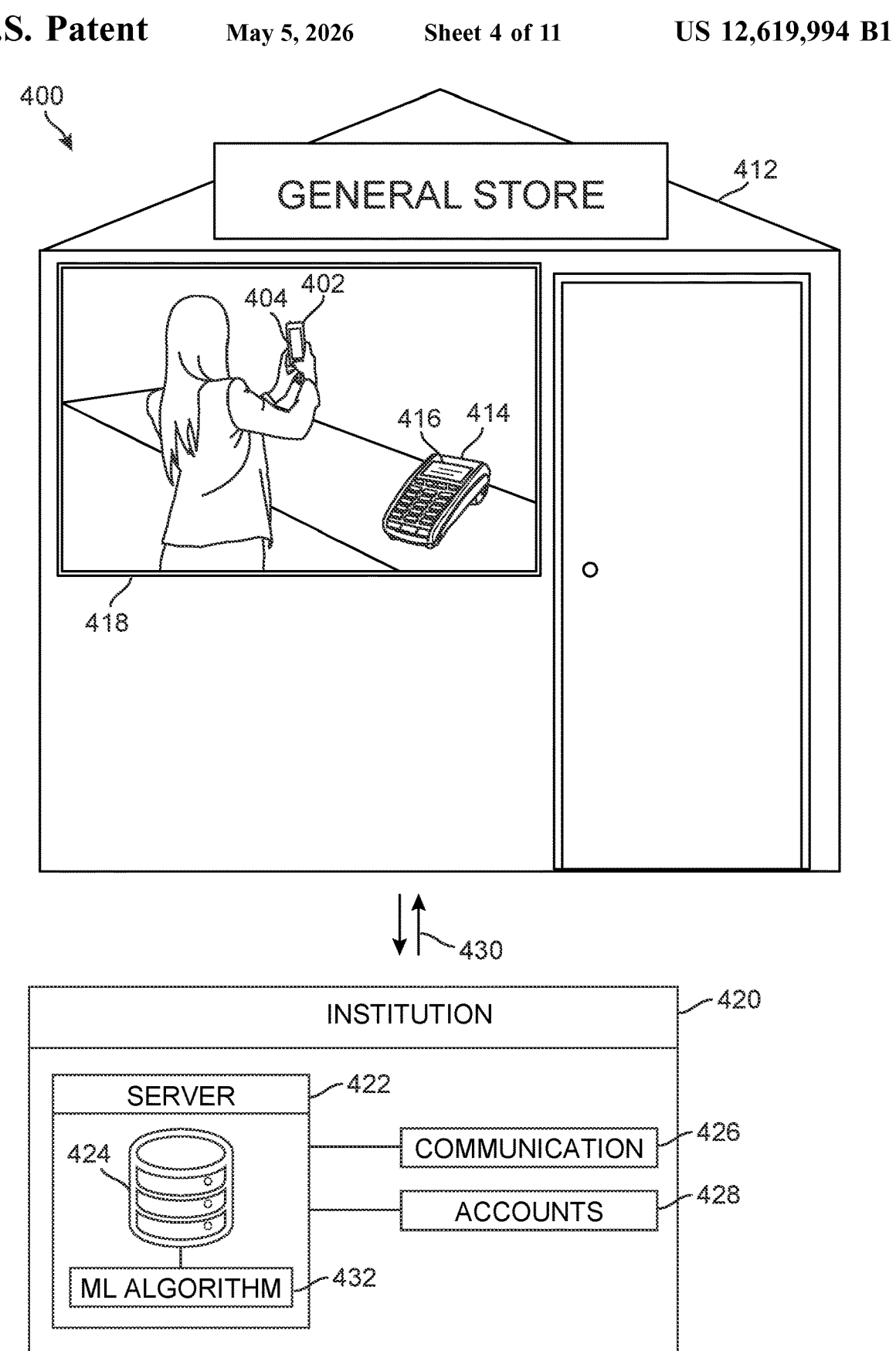
FIG. 4 is a schematic diagram showing communications between a customer's mobile device, a store, and a remote financial institution.

FIG. 4 is a schematic diagram 400 showing communications between a customer's mobile device 402, a point-of-sale terminal 414, a store 412, and a remote financial institution 420 while the customer is making a purchase, in one embodiment. Mobile device 402 and point-of-sale terminal 414 are visible in store 412 through window 418. In schematic diagram 400, a customer wants to use virtual credit blocks to make a purchase at store 412. For this purpose, mobile device 402 includes a touch screen 404 for managing virtual credit blocks, in an embodiment. Touch screen 404 on mobile device 402 allows the customer to submit his or her virtual credit block credentials to a point-of-sale terminal 414 in store 412. In an embodiment, customers can do this by pressing a "submit" button (such as "submit" button 122 shown in FIG. 1) on touch screen 404. A mobile pay platform 416 running on point-of-sale terminal 414 manages the virtual credit purchase in this embodiment. This occurs using a wireless data transfer technology such as near field communications (NFC), Bluetooth or other wireless data transfer. Thus, the exchange of data related to the transaction occurs using a short-range data transfer wireless communication. In this embodiment, if the customer presses a "submit" button to make a purchase using these virtual dynamic credit blocks, an app (such as app 326 on FIG. 3, for example) must first approve the transaction, in one embodiment. Such approval consists of making sure the amount of the attempted transaction obeys a specified monetary limit for the virtual credit block to be used and that the risk score calculated by the app for the transaction does not exceed a pre-determined specified value. If the app approves the attempted transaction, then mobile device 402 submits the virtual credit block credentials to point-of-sale terminal 414 via a short-range wireless communication.

If mobile device 402 approves the attempted financial transaction, point-of-sale terminal 414 transmits the virtual credit block credentials from mobile device 402 to institution 420 to ensure that institution 420 approves of the transaction as well in one embodiment. Such transmission occurs via a point-of-sale network connection 430, which in some embodiments could occur over a landline, a cable network, or via a private electronic payments network, or other network. A transactions processing server 422 housed by institution 420 receives the incoming virtual credit block credentials from point-of-sale terminal 414 via a communications module 426 to approve or deny the transaction. In some embodiments, such an approval decision checks to make sure the transaction authorization code of the associated virtual credit block matches one of the active transaction authorization codes for an account associated with institution 420. Active transaction authorization codes are stored in a database 424, which may be a part of server 422 as shown in FIG. 4, or may be housed separately. Accounts database 428 is in communication with server 422 as shown in FIG. 4. In another example, accounts database 428 may be housed within server 422, or may be included in database 424 itself. In this embodiment, transaction information, including the amount of the transaction and a timestamp and the transaction authorization code are stored in database 424 for later settlement. Institution 420 then passes the approval or denial decision to point-of-sale terminal 414, which may forward this decision to mobile device 402 as well. In some embodiments, settled transactions may be debited to an account stored in accounts database 428. Machine learning algorithm 432 may be updated based upon the transactions as they are approved or denied.

Figure 5:
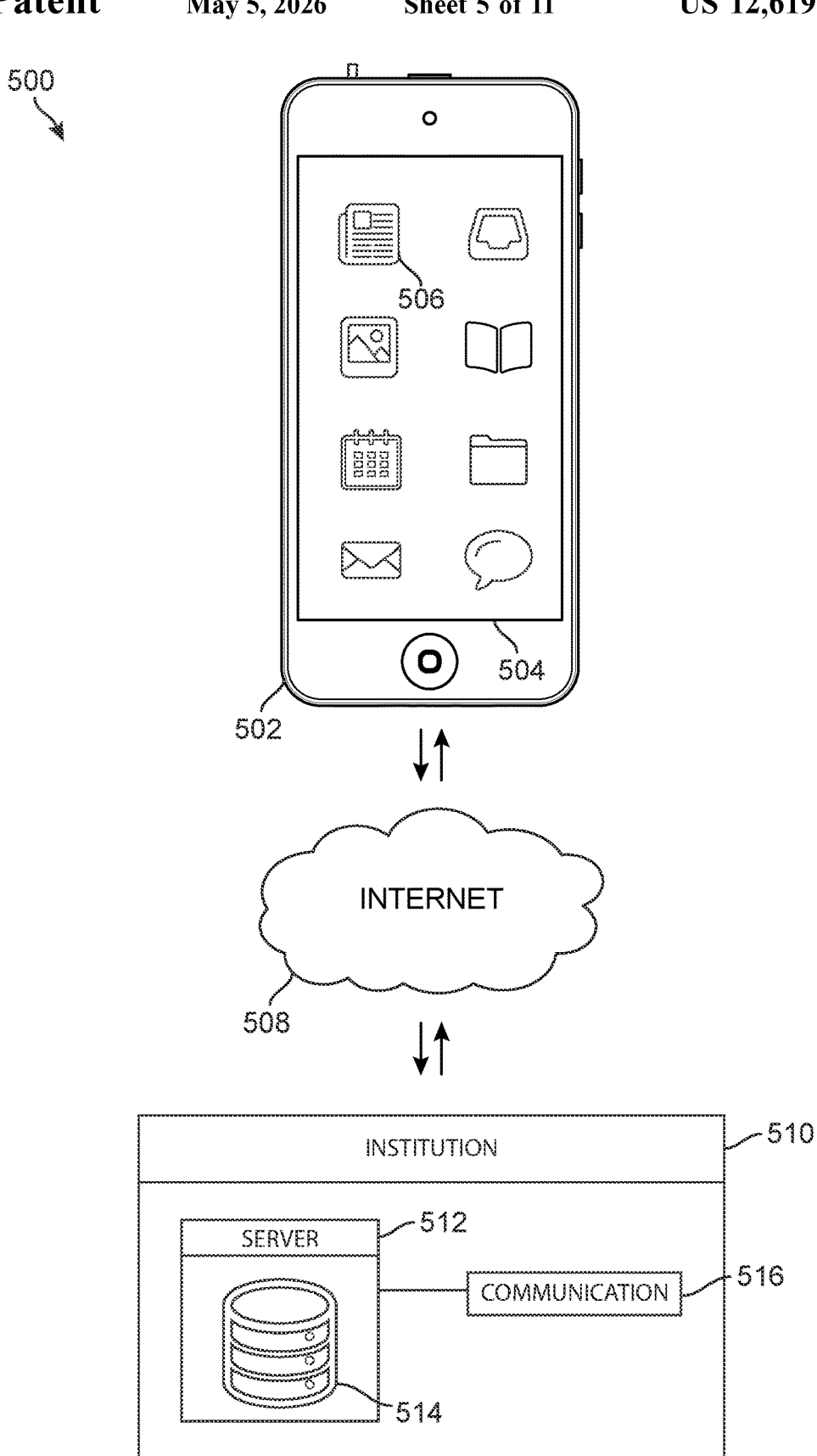
FIG. 5 is a schematic diagram showing communications between a customer's mobile device and a remote financial institution, in an embodiment.

FIG. 5 is a schematic diagram 500 showing communications between a customer's mobile device 502 and a remote financial institution 510 to settle any transactions that have occurred with mobile device 502, after mobile device 502 is once again online, in an embodiment. In diagram 500, mobile device 502 has a wireless connection to institution 510 over Internet 508. An app 506 in mobile device 502 runs in the background managing the virtual credit blocks associated with the user of mobile device 502. It checks to see if there are any used virtual credit blocks that have not been "settled" with institution 510, in one embodiment. If so, settlement occurs as mobile device 502 transmits to institution 510 all the transaction data for all the unsettled virtual credit blocks, including transaction authorization codes; transaction dollar amounts and a timestamp, for example.

A transactions processing server 512, housed in institution 510, receives this transaction data via a communications module 516 and checks the received transaction data from mobile device 502 against received transaction authorization codes (that may be stored in database 514, for example) from point-of-sale terminals in the institution's network. If there is a discrepancy, any conflicting data are flagged for further investigation. If there is no discrepancy, an account, such as a credit card account or a debit card account, associated with the customer using mobile device 502 is updated with the relevant transaction dollar amounts. In some embodiments, at the conclusion of these settlement steps, institution 510 then transmits new virtual credit block credentials to mobile device 502 for later use. In some embodiments, the received transaction data, along with any possible transaction discrepancies, is provided to a machine learning algorithm to hone its ability to predict possible fraudulent transactions and to adjust the size, range and number of future dynamic virtual credit blocks. In some embodiments, a machine learning algorithm (such as machine learning algorithm 432 shown in FIG. 4) running on a server housed by institution 510 updates a risk score calculator associated with app 506 based on the just-received transaction data.

Figures 6, 7:
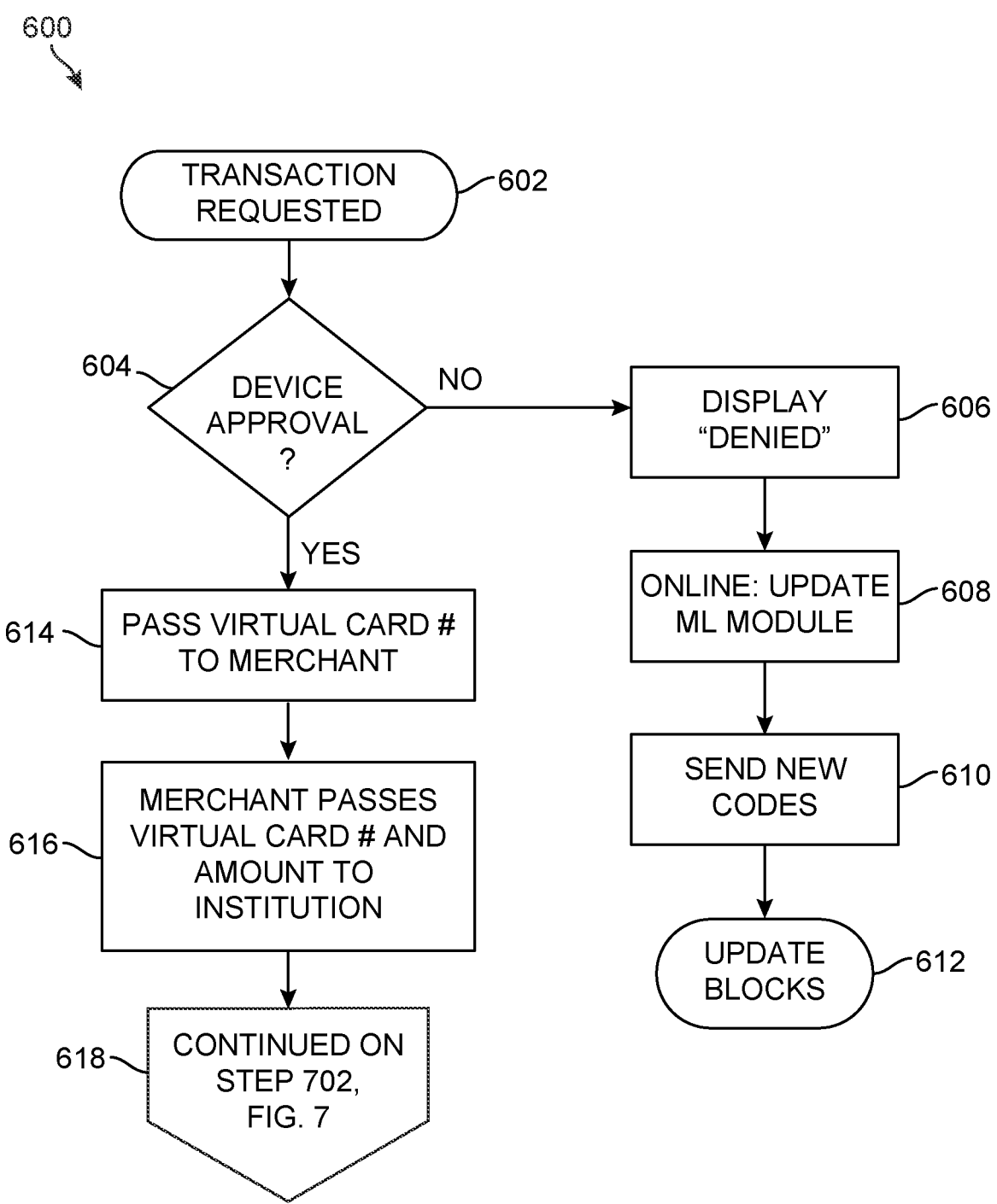
FIG. 6 is a flowchart illustrating a first portion of a method for undertaking financial transactions using virtual credit blocks, in an embodiment.
FIG. 7 is a flowchart illustrating a second portion of the embodiment of FIG. 6.
Figure 7:
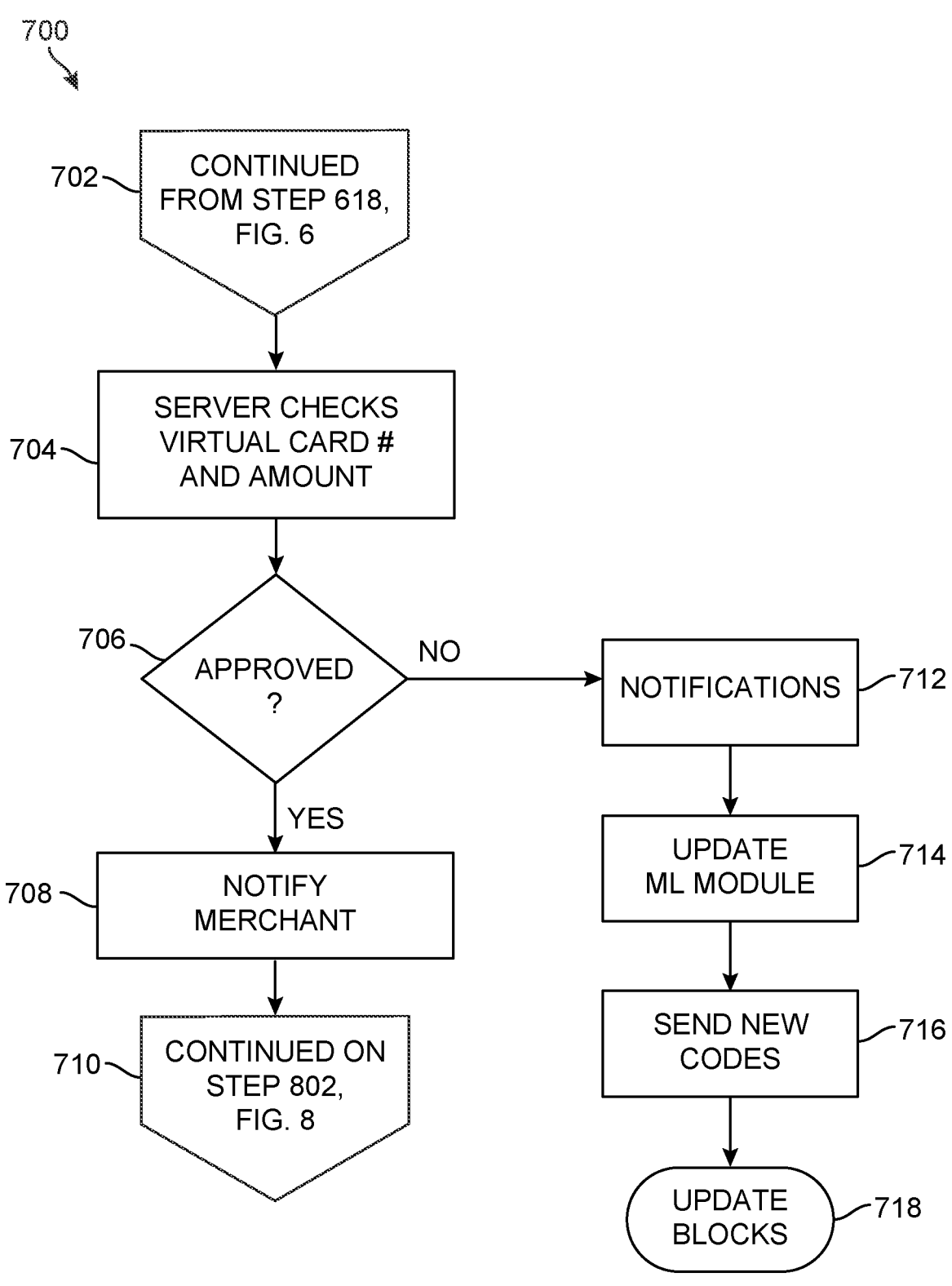

FIG. 6 shows an exemplary flowchart 600 illustrating a portion of a method for undertaking financial transactions using virtual credit blocks loaded onto a mobile device in one embodiment. Flowchart 600 begins with step 602 when a customer of a financial institution requests a transaction involving virtual credit blocks stored on his or her mobile device. At step 604, the mobile device approves or denies the requested transaction.

In some embodiments, step 604 is executed by an app running on the mobile device responsible for managing virtual credit blocks. The app uses a risk score calculator to determine the likelihood that the requested transaction is legitimate, i.e., that it was requested by the actual account holder. It then approves the transaction if this likelihood exceeds a specified threshold and the dollar value of the requested transaction does not exceed monetary limit specified in the block (or, in some embodiments, blocks). In some embodiments, this risk score calculator is programmed and updated by a machine learning algorithm (such as machine learning algorithm 432 shown in FIG. 4) running on a remote server associated with the financial institution, which establishes a regular pattern of use for the account associated with the virtual credit blocks. If the mobile device does not approve of the transaction, then at step 606, the mobile device displays "denied" to the customer. Once the mobile device is able to make a wireless connection to the financial institution, then at step 608, the mobile device sends transaction data for the attempted financial transaction to the institution to update a machine learning algorithm which predicts the likelihood of fraudulent transactions. In some embodiments, such transaction data includes transaction authorization codes, timestamps, customer locations, and merchant identifying information. At step 610, the financial institution generates a set of new transaction authorization codes and new virtual credit blocks for the customer and transmits them to their mobile device. At step 612, an app on the customer's mobile device receives these new virtual credit blocks for later requested financial transactions, and updates its blockchain ledger.

If, at step 604, the mobile device approves of the transaction, then it passes a set of credentials, including a virtual card number and other account data (such as an expiration date) associated with the active virtual credit block to the merchant's point-of-sale terminal at step 614. In this embodiment, such a virtual card number is in the form of a credit card number and is associated with the transaction authorization code for the active virtual credit block. At step 616, the merchant passes the credentials, including a virtual card number and associated account data to the financial institution for its own approval decision. Flowchart 600 ends at step 618, where the process is directed for continuation in FIG. 7 at step 702.

FIG. 7 is a flowchart 700 which continues the method started in FIG. 6, in one embodiment. At step 704, a server associated with the financial institution checks the credentials and the amount of the transaction against a database of active virtual credit blocks. If the server discovers a discrepancy between the presented credentials and the database, it does not approve the transaction at step 706, and at step 712 it notifies the merchant of the denial. In this embodiment, the merchant's point-of-sale terminal notifies the customer's mobile device of the denial. This denial may then be used to update new monetary limits for any remaining virtual credit blocks stored on the customer's phone. At step 714, the transaction data and the denial are provided to a machine learning algorithm which predicts the likelihood of fraudulent transactions. In some embodiments, such transaction data includes transaction authorization codes, timestamps, customer location and merchant identifying information. At step 716, the financial institution generates new transaction authorization codes and a new set of virtual credit blocks. It also updates a risk score calculator for the customer, and transmits the blocks and any updates for the risk score calculator to the risk score calculator stored on the customer's mobile device when the mobile device is online. At step 718, an app on the customer's mobile device receives and updates its virtual credit blocks for later requested financial transactions. In some embodiments, the customer's mobile device updates the risk score calculator associated with the mobile device app which manages the virtual credit blocks.

Figure 8:
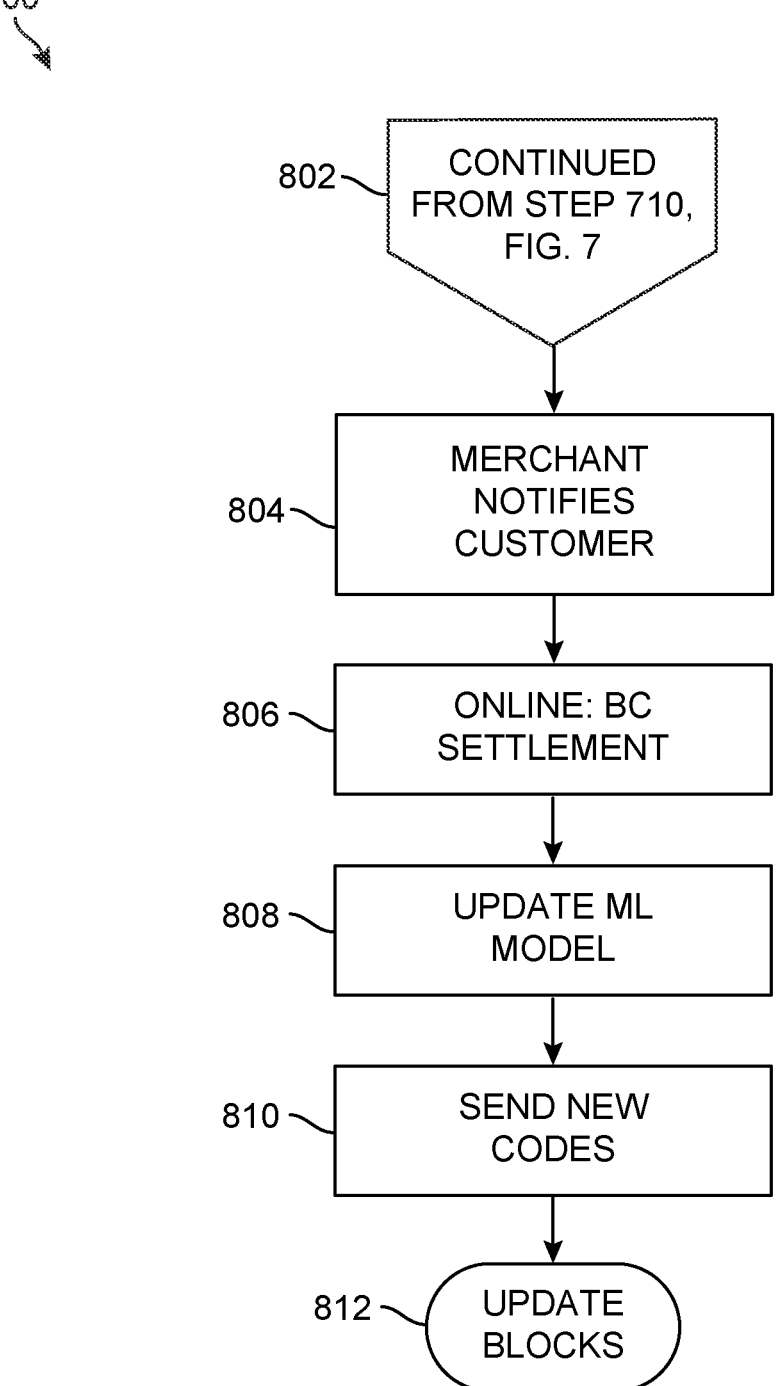
FIG. 8 is a flowchart illustrating a concluding portion of the embodiment of FIG. 6.

If no such discrepancy exists, then the institution notifies the merchant of the approval of the requested transaction at step 708, ending flowchart 700, and directing the process at step 710 to continue with step 802 of FIG. 8.

FIG. 8 is a flowchart 800 which concludes the method of FIG. 6 in this embodiment. At step 804, the merchant's point-of-sale terminal notifies the customer's mobile device of the approval of the requested financial transaction. An app running on the customer's mobile device then updates any remaining virtual credit blocks based upon the transaction data. Such an update may include de-activating the used virtual credit block, activating the next block and potentially changing the monetary limits of the remaining blocks.

At step 806, when the customer's mobile device goes online, settlement occurs between the blockchain ledger formed from all of the customer's used virtual credit blocks since the last settlement occurred and the transaction record stored by the financial institution for the customer's account. In some embodiments, such settlement includes matching transaction authorization codes, transaction dollar amounts and timestamps for the blocks forming the mobile device's blockchain ledger. It may also include reconciling this data with any related transaction data received by the institution previously. In some embodiments, if a discrepancy exists, the conflicting records are flagged and the customer is notified of potentially fraudulent activity on their account. If no discrepancy exists then the customer's account is updated to reflect their recent activity.

At step 808, the transaction data from the mobile device's blockchain ledger and any additional data relating to the transaction are fed into a machine learning algorithm housed in the server (such as machine learning algorithm 432 shown in FIG. 4) which predicts the likelihood of fraudulent transactions and updates the algorithm in the machine learning model. In some embodiments, such transaction data includes transaction authorization codes, timestamps, and merchant identifying information. In some embodiments, additional circumstantial data that might be used to predict future fraudulent behavior are input to the machine learning algorithm as well. At step 810, the financial institution generates new transaction authorization codes and a set of new virtual credit blocks, updates a risk score calculator for the customer, and transmits the blocks and the risk score calculator to the customer's mobile device. The method ends at step 812, when an app on the customer's mobile device receives and updates the virtual credit blocks with these new transaction authorization codes for later requested financial transactions. In some embodiments, the customer's mobile device updates the risk score calculator associated with the mobile device app which manages the virtual credit blocks.

Figure 9:
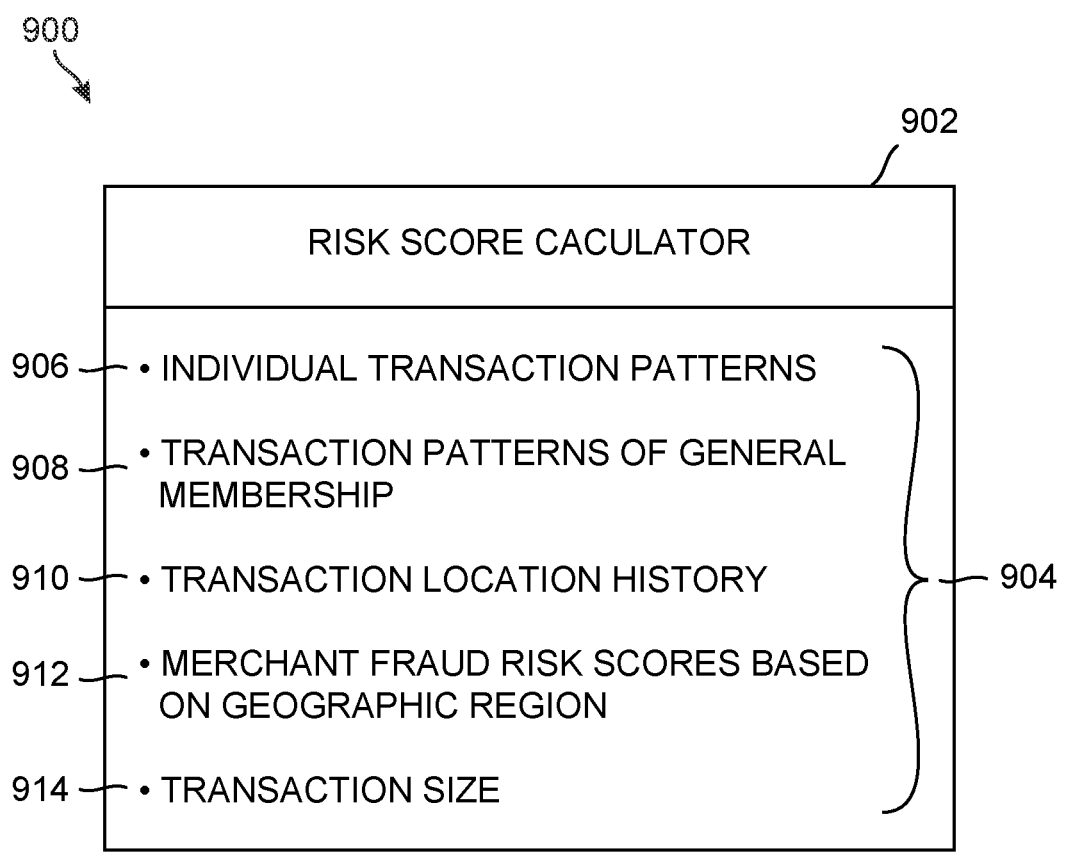
FIG. 9 is a chart illustrating factors that an app may use to calculate a risk score using virtual credit blocks, in an embodiment.

FIG. 9 is a chart 900 illustrating exemplary factors 904 that may be applied by a risk score calculator app 902 to calculate a risk score for attempted financial transactions using virtual credit blocks loaded onto a mobile device, in one embodiment. In this embodiment, an app on the mobile device managing the use of these virtual credit blocks calculates a risk score for any attempted financial transaction using these virtual credit blocks. These risk scores are used to approve or deny the attempted financial transaction by the mobile device itself and as well to adjust the number and monetary limits attached to the remaining virtual credit blocks. Factor 906 relates to the individual transaction patterns of the customer associated with the mobile device, in one embodiment. Factor 908 relates to the transaction patterns of the general membership of the financial institution providing these virtual credit blocks, in one embodiment. Factor 910 relates to data regarding the frequency of fraudulent transactions of attempted financial transactions undertaken at the reported location of the mobile device in one embodiment. Factor 912 relates to data regarding the frequency of fraudulent transactions for merchants in the reported geographic region in which the mobile device is presently located, in this embodiment. This list of factors may also include, as factor 914, the monetary size of the attempted financial transactions in this embodiment.

In some embodiments, customer preferences are used to set risk thresholds to which a risk score calculation may be compared. Customers tolerating greater amounts of risk may choose to allow somewhat more risky transactions. In some embodiments, past attempted financial transaction data is analyzed by a machine learning algorithm to produce rules that attempt to predict the likelihood that attempted financial transactions are legitimate. These rules are transmitted to the mobile device for implementation for future attempted financial transactions.

Figure 10:
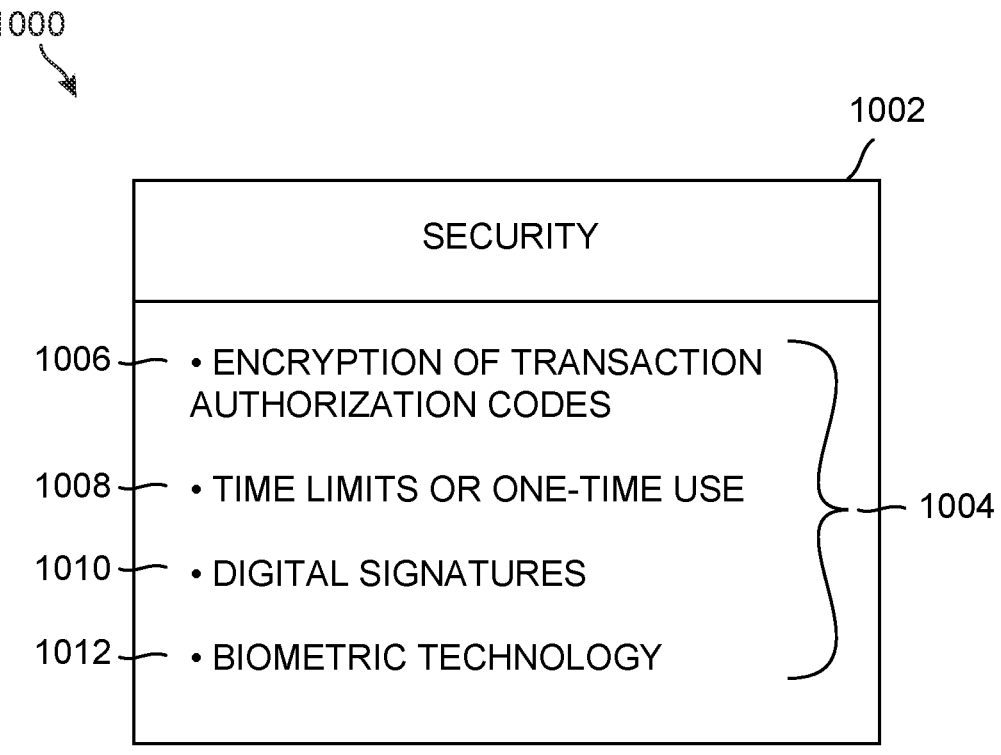
FIG. 10 is a chart illustrating security features of a system undertaking financial transactions using virtual credit blocks, in an embodiment.

FIG. 10 is a chart 1000 illustrating security features 1004 used by a security app 1002 in a system for undertaking financial transactions using virtual credit blocks loaded onto a mobile device, in an embodiment. These features include feature 1006, encryption of the transmission to the mobile device of the transaction authorization codes generated by the remote financial institution providing the virtual credit blocks in this embodiment. Feature 1008 places time limits on the validity of the transaction authorization codes, in one embodiment. In another embodiment, feature 1008 may represent a "one-time use" embodiment, that may only allow using a transaction authorization code once before it expires. These features include, as feature 1010, digitally signing the virtual credit block transactions that are attempted by the mobile device in this embodiment. Such digital signatures may be implemented using any suitable cryptographic method. These features include, as feature 1012, an app managing the use of these virtual credit blocks making use of biometric measurements to verify the identity of the person using the mobile device. In some embodiments, such biometric measurements could include voice recognition measurements, fingerprint recognition measurements, and facial recognition measurements. In some embodiments, additional security may include copying and distributing the set of attempted virtual credit block transactions as a distributed ledger that can be verified by the institution or by some other agency.

Figure 11:
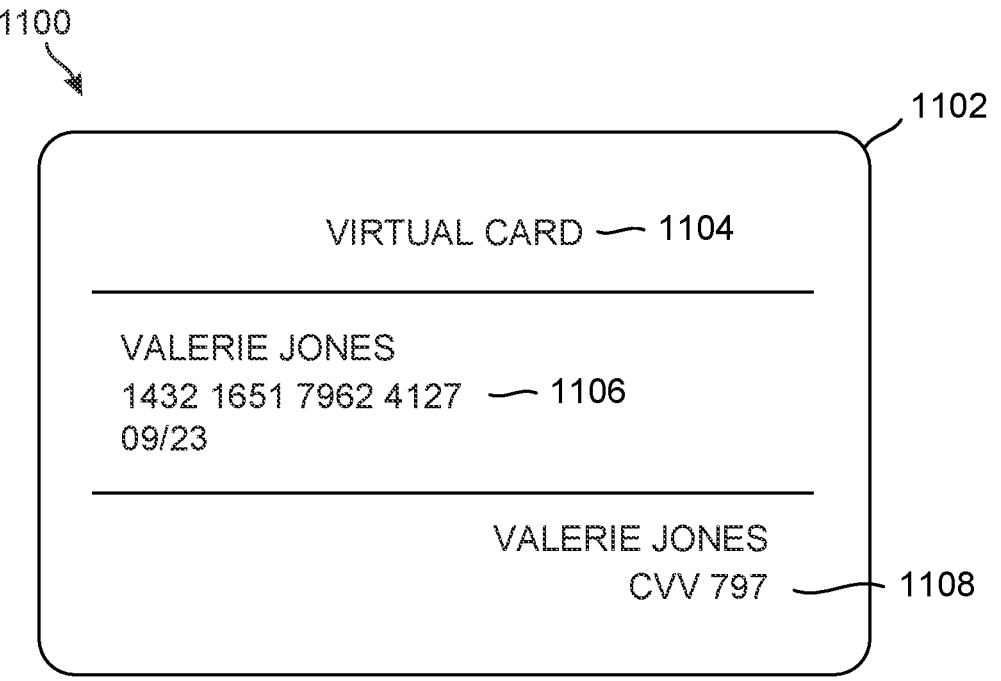
FIG. 11 is a schematic diagram of a mobile device display that may be shown to merchants who do not accept wireless transactions, in an embodiment.

FIG. 11 is a schematic diagram 1100 of a mobile device display 1102 showing a virtual card number and other account details for merchants that cannot accept wireless transactions. In this embodiment, an image of the front of a credit card, 1106 is generated and displayed. This image may include an account holder name and a credit account number, which is for one-time use. This image may include the name of this virtual card system 1104, called "Virtual Card" in the example of FIG. 11. In this embodiment, an image of the back of a credit card 1108, including a CVV number, may be generated and displayed as well. In some cases, it may also include an account holder signature. In other embodiments, depending on the point-of-sale capabilities of the merchant, other formats to display this information are generated instead. In some embodiments, such a format is a bar code. In other embodiments, such a format is a QR code.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A mobile device that allows a person using the mobile device to consummate financial transactions with a point-of-sale system when the mobile device is off-line, comprising:

a memory and a processor, the processor and memory configured to enable the mobile device to include a first preloaded set of financial blocks which are associated with a financial institution; and each financial block in the first preloaded set of financial blocks includes a monetary limit;

each financial block in the first preloaded set of financial blocks being authorized for use over a different pre-specified time interval from each of the other financial blocks in the first preloaded set of financial blocks, after which the next block in sequence is activated for further financial transactions;

an app on the mobile device that is configured to calculate a risk score for any attempted transaction the risk score being at least partially based on transaction location history using location history data generated by a GPS component on the mobile device, and to one of approve and deny an attempted transaction based upon the risk score and the monetary limit included in the financial block; and a screen on the mobile device that displays information relating to the attempted transaction; and a wireless communications module configured to communicate with a point-of-sale terminal using a short-range data transfer wireless communication protocol when the mobile device is not in electronic communication with the financial institution;

first pre-loaded set of financial blocks being in the form of a blockchain ledger that is stored on the mobile device, and the first pre-loaded set of financial blocks are loaded into the mobile device while the mobile device is in communication with the financial institution;

each block in the first pre-loaded set of financial blocks in the form of the blockchain ledger on the mobile computing device is associated with a dynamically assigned transaction authorization code assigned by the financial institution which acts as a virtual credit card number, such that the mobile device is configured to use the first pre-loaded set of financial blocks thereon to consummate a financial transaction with the point-of-sale system when the mobile device is not in electronic communication with the financial institution;

the mobile device being configured to send the blockchain ledger to the financial institution upon the mobile device being in electronic communication with the financial institution after a period of not being in electronic communication with the financial institution, then the mobile computing device receives a new preloaded set of financial blocks from the financial institution;

the new preloaded set of financial blocks differing from the first preloaded set of financial blocks with respect to at least one of the monetary limit of each of the blocks, the pre-specified time internal of each of the blocks, and a number of blocks in the set of financial blocks, a difference between the new preloaded set of financial blocks and the first preloaded set of financial blocks being based on the risk score that was calculated for the attempted transaction using the first preloaded set of financial blocks.

2. The mobile device of claim 1, wherein the app is configured to digitally sign the attempted transaction.

3. The mobile device of claim 1, further comprising digital signatures, wherein each digital signature is associated with a specific attempted transaction.

4. The mobile device of claim 1, wherein the authorization codes are generated by the financial institution, and are encrypted prior to transmittance to the mobile device.

5. A mobile device comprising:

a memory and a processor, the processor and memory configured to enable the mobile device to include a managing app;

a first pre-loaded set of financial blocks;

each financial block in the first preloaded set of financial blocks being authorized for use over a different pre-specified time interval from each of the other financial blocks in the first preloaded set of financial blocks, after which the next block in sequence is activate for further financial transactions; and each financial block in the first preloaded set of financial blocks including a respective monetary limit, the respective monetary limit associated with each financial block in the first preloaded set of financial blocks being different from the respective monetary limit associated with each of the other financial blocks in the first preloaded set of financial blocks;

a wireless communications module in the mobile device configured to communicate with a point-of-sale terminal using a short-range data transfer wireless communication protocol when the mobile device is not in electronic communication with the financial institution;

a GPS component in the mobile device, the GPS component being configured to generate location history data;

the managing app is being configured to determine whether a proposed transaction should be authorized based upon data associated with at least one financial block in the first pre-loaded set of financial blocks;

the managing app being configured to submit a virtual credit block credential and an authorization code to the point-of-sale terminal with the short-range data transfer wireless communication protocol when the proposed transaction is consistent with the data stored associated with the financial block; and wherein the managing app further includes a risk score calculator that provides a risk score that is used to determine whether the proposed transaction should be authorized, the risk score being at least partially based on transaction location history using the location history data generated by the GPS component on the mobile device;

wherein the first pre-loaded set of financial blocks are in the form of a blockchain ledger that is stored on the mobile device, and the first pre-loaded set of financial blocks are loaded into the mobile device while the mobile device is in communication with the financial institution;

wherein each block in the first pre-loaded set of financial blocks in the form of the blockchain ledger on the mobile computing device is associated with a dynamically assigned transaction authorization code assigned by the financial institution which acts as a virtual credit card number, such that the mobile device is configured to use the first pre-loaded set of financial blocks thereon to consummate a financial transaction with the point-of-sale system when the mobile device is not in electronic communication with the financial institution;

wherein the mobile device is configured to send the blockchain ledger to the financial institution upon the mobile device being in electronic communication with the financial institution after a period of not being in electronic communication with the financial institution, then the mobile computing device receives a new preloaded set of financial blocks from the financial institution the new preloaded set of financial blocks differing from the first preloaded set of financial blocks with respect to at least one of the monetary limit of each of the blocks, the pre-specified time internal of each of the blocks, and a number of blocks in the set of financial blocks, a difference between the new preloaded set of financial blocks and the first preloaded set of financial blocks being based on the risk score that was calculated for the attempted transaction using the first preloaded set of financial blocks.

6. The mobile device of claim 5, wherein the mobile device is configured to transmit the virtual credit block credential to an institution that will pay the price of the transaction to a merchant associated with the specific point-of-sale terminal.

7. The mobile device of claim 5, wherein the managing app clears the financial blocks stored on the mobile device and receives a new set of financial blocks and transaction authorization codes after carrying out a settlement with the financial institution.

8. The mobile device of claim 5, comprising a touch screen configured to allow customers to submit their virtual credit block credentials to point-of-sale terminals.

9. A system for consummating proposed transactions when remote mobile devices associated with an institution are off-line comprising:

a server housed at the institution in communication with a database comprising transaction authorization codes, the institution also comprising a database of accounts associated with the remote mobile devices, wherein the accounts are at least one of bank accounts and credit card accounts;

wherein the server is configured to transmit a first set of pre-loaded dynamic financial blocks identified by transaction authorization codes to the remote mobile devices for use as virtual credit blocks when the remote mobile devices are off-line;

each financial block in the first preloaded set of financial blocks being authorized for use over a different pre-specified time interval from each of the other financial blocks in the first preloaded set of financial blocks, after which the next block in sequence is activate for further financial transactions; and each financial block in the first preloaded set of financial blocks including a respective monetary limit, the respective monetary limit associated with each financial block in the first preloaded set of financial blocks being different from the respective monetary limit associated with each of the other financial blocks in the first preloaded set of financial blocks;

when the remote mobile devices are back on-line, the server being configured to settle any transactions consummated by the remote mobile devices when the remote mobile devices were off-line, and to debit the accounts accordingly;

each of the remote mobile devices including a risk score calculator that provides a risk score that is used to determine whether a proposed transaction should be authorized when a respective remote mobile device is off-line, the risk score being at least partially based on transaction location history using location history data generated by a GPS component on the respective mobile device, the first pre-loaded set of financial blocks being in the form of a blockchain ledger that is stored on the remote mobile devices, and the first pre-loaded set of financial blocks are loaded into each of the remote mobile devices while the mobile device is in communication with the financial institution;

each block in the first pre-loaded set of financial blocks in the form of the blockchain ledger on the mobile computing device being associated with a dynamically assigned transaction authorization code assigned by the financial institution which acts as a virtual credit card number, such that the mobile device is configured to use the first pre-loaded set of financial blocks thereon to consummate a financial transaction with the point-of-sale system when the mobile device is not in electronic communication with the financial institution;

wherein each of the remote mobile devices is configured to send the blockchain ledger to the financial institution upon the mobile device being in electronic communication with the financial institution after a period of not being in electronic communication with the financial institution, then the mobile computing device receives a new preloaded set of financial blocks from the financial institution;

the new preloaded set of financial blocks differing from the first preloaded set of financial blocks with respect to at least one of the monetary limit of each of the blocks, the pre-specified time internal of each of the blocks, and a number of blocks in the set of financial blocks, a difference between the new preloaded set of financial blocks and the first preloaded set of financial blocks being based on the risk score that was calculated for the attempted transaction using the first preloaded set of financial blocks.

10. The system of claim 9, wherein the virtual credit blocks are each limited to a one-time use.

11. The system of claim 9, wherein the server is configured to receive digital signatures authenticating the transactions consummated by the remote mobile devices.

12. The system of claim 9, wherein the server is configured to check the transaction authorization codes received from the remote mobile devices against its database of authorization codes for its active virtual credit blocks and debit the accounts whenever there is no discrepancy between the received transaction authorization codes and the authorization codes in its database of authorization codes.

13. The system of claim 9, further comprising providing data relating to the transactions consummated by the remote mobile devices to a machine learning algorithm housed in the server.

5

* * * * *